United States Patent [19]

Bowen et al.

[11] Patent Number: 4,979,793

[45] Date of Patent: Dec. 25, 1990

[54] OPTICAL SIMULATOR WITH LOOP-BACK ATTENUATOR AND ADJUSTABLE PLUNGER MECHANISM

[75] Inventors: Terry P. Bowen, Etters; Paul R. Reitz, Palmyra, both of Pa.

[73] Assignee: AMP Incorporated, Harrisburg, Pa.

[21] Appl. No.: 482,579

[22] Filed: Feb. 21, 1990

[51] Int. Cl.$^5$ .............................................. G02B 6/36
[52] U.S. Cl. ............................ 350/96.20; 250/227.16; 350/96.15
[58] Field of Search ............... 350/96.15, 96.16, 96.18, 350/96.20, 96.21; 356/72, 73.1, 432, 433, 434, 435; 250/227.11, 227.14, 227.16

[56] References Cited

U.S. PATENT DOCUMENTS

| | | | |
|---|---|---|---|
| 4,697,869 | 10/1987 | So et al. | 350/96.15 |
| 4,721,351 | 1/1988 | Goepfert et al. | 350/96.15 |
| 4,736,100 | 4/1988 | Vastagh | 350/96.20 X |
| 4,848,872 | 7/1989 | Shigematsu et al. | 350/96.15 X |
| 4,904,044 | 2/1990 | Tamulevich | 350/96.18 |

OTHER PUBLICATIONS

Designer's Guide to Fiber Optics, AMP, Inc., 1983, pp. 30–36.

Primary Examiner—John D. Lee

[57] ABSTRACT

An optical simulator 10, shaped to be interchangeable with a complementary connector 7 that intermates with an optical connector housing 6 having an optical emitter 4 and an optical detector 5, comprises an alignment fixture 12 with connectors 21 and 22 for intermating with the optical emitter 4 and the optical detector 5, and an optical fiber 11 formed in a loop and installed within the alignment fixture 12 with a first end face 39 of the loop 11 aligned through a corresponding alignment fixture connector 24, with the emitter 4 and a second end face 37 of the loop 11 aligned through a corresponding alignment fixture 25, with the detector 5 of the optical connector 6. The optical fiber 11 further comprises an adjustable plunger mechanism 15 fitted through the body of the alignment fixture 12 to impose against the optical fiber 11 formed in a loop to thereby permit varying the degree of curvature of the loop by interjecting and retracting the plunger 15 against the loop.

6 Claims, 3 Drawing Sheets

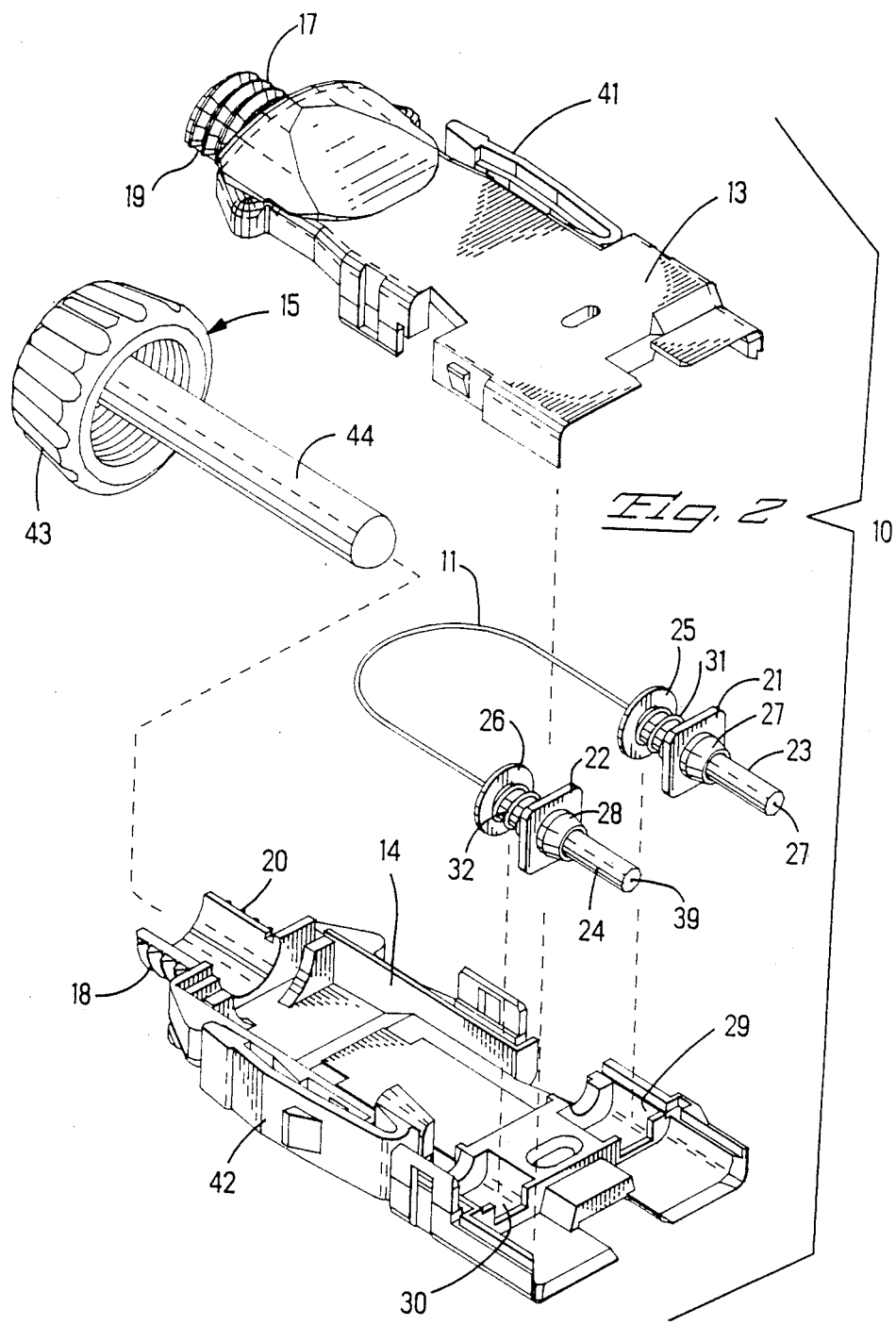

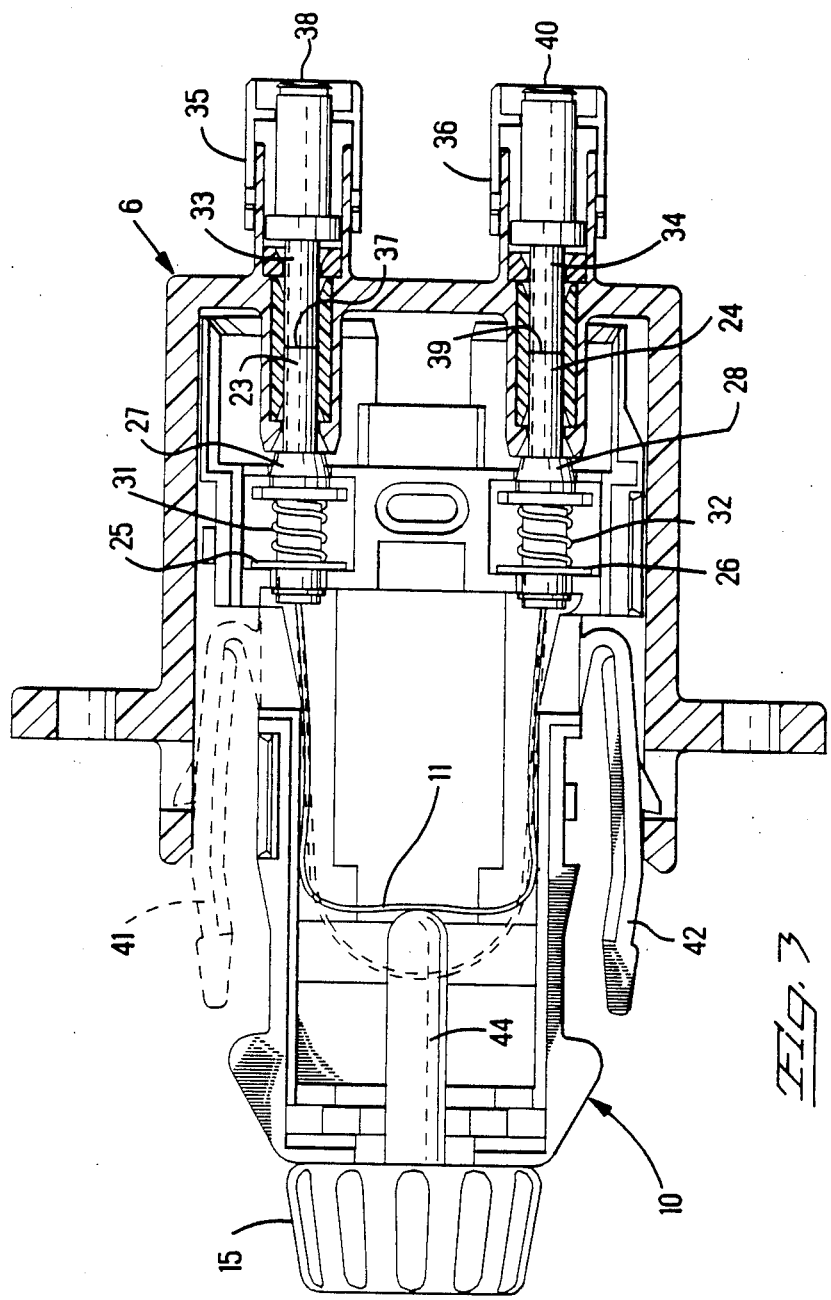

OPTICAL SIMULATOR WITH LOOP-BACK ATTENUATOR AND ADJUSTABLE PLUNGER MECHANISM

FIELD OF THE INVENTION

The invention relates to testing optical equipment such as a transceiver, or optical fiber cable, prior to installation in an optical communications system, or for diagnostic testing after installation, and particularly to a simulator for testing such optical equipment.

BACKGROUND OF THE INVENTION

Optical communications systems utilize optical signals to transmit information among various items of optical equipment that are coupled to the systems. The systems utilize optical fiber cables for transmitting the carrier waves from one item of equipment to another. For example, an optical communications system may comprise a computer central processing unit (CPU), a workstation, a peripheral, such as a printer, each of which is equipped with optical transmitting and receiving devices, and optical fiber cables linked among the CPU, the workstation and printer.

Each item of optical equipment is coupled to the optical fiber cables by means of an optical connector to allow a means of disconnecting the equipment from the optical fiber cables. Such systems may utilize two optical fibers, one for receiving optical signals from an item of optical equipment, and another for sending optical signals. Each optical transmitter has an optical emitter for sending the signals, and each optical receiver has an optical detector for receiving the signals.

Testing of such items of optical equipment is a necessity to assure proper design. In testing, the test conditions must accurately simulate the anticipated operating environment. In operation, systems of optical fiber waveguides experience attenuation, which is loss of the transmitted optical power. Attenuation for fiber is specified in decibels per kilometer(dB/km).

Systems utilizing optical fiber cables and other components are specified in terms of the maximum optical attenuation that can occur between the transmitting and receiving devices, while still providing information transfer with substantially no errors. Typically, testing of such systems is done by simulation whereby the emitter and detector of the item of optical equipment to be tested is connected to a device that simulates the optical system, and the operation of the item is tested as though the item were coupled into the system itself and not the testing device.

First simulators were devices capable of generating special test signals. Testing was performed externally on the item of equipment being tested. Recently, optical equipment has been designed with internal testing capabilities. With self-testing, the expense of specialized testing equipment and associated testing procedures has been substantially reduced. In place of long lengths of cabling to simulate actual operations and in place of simulators that are devices that produce complex signals or measurements, are simplified simulators comprising internal attenuating devices such as the simplified loop-back attenuator. It is anticipated that such simulation will be used primarily as a simplified and inexpensive means of diagnosing and localizing failures in complex systems of installed equipment.

The present invention relates to simulators which are loop-back attenuators, defined as simulators providing a communication signal path that forms a loop from the emitter to a detector of the same item of optical equipment such that optical signals transmitted from the item under test are looped back to the same item and internally transmitted among its component parts. Consequently, communications from a transmitter to a receiver within the unit of equipment can be accomplished without operation of other units of equipment. Functionality of the optical transmitter and receiver, as well as all electronic circuitry used to generate the required optical signals, can be quickly determined. Simulators which are loop-back attenuators purposely simulate a loss of signal intensity expected of a communications system in which the item may be installed for "on-line" operation. Vastagh, U.S. Pat. No. 4,736,100, discloses a known loop-back attenuator involving an optical fiber cable formed in a loop and having ends of the fiber connected with alignment ferrules. The loop is installed in an alignment fixture that will align the ends of the loop with the emitter and detector of the item to be tested.

This known loop-back attenuator suffers from disadvantages, mainly that of accurately duplicating the amount of attenuation in the operations system so that the testing device creates an environment approximating the operation of the actual system for meaningful test results. Additionally, results can significantly vary from one type of transmitting or receiving device to another since there is no coupling and confinement mechanism similar to that which the optical emission will encounter in actual use.

Objects of the present invention include providing a simulator in the nature of a loop-back attenuator that, in a compact device, is capable of reproducing the total attenuation of a substantially larger cable network. Other objects include providing a device capable of sufficiently attenuating optical power between emitter and detector of a transceiver or the like, to prevent saturation of the detector, and providing a device which easily and accurately may be controllably altered to match the particular amount of attenuation desired to simulate actual environmental operating conditions or to meet manufacturer's standards.

Another problem is that devices of different manufacturers, and even, indeed, the same device of the same manufacturer, have emitters that put out differing optical power. An objective in this respect, is to provide a device which may easily be altered to accommodate the differing optical power outputs of devices and the attenuation characteristics to be expected in the operating systems. Hence, another objective of the present invention is providing an optical simulator which is a loop-back attenuator usable on a variety of combinations of emitter and detector elements of a transceiver, which will approximate operating environments and which will effectively reduce power output so that the detector will not be saturated, or so that the detector receives a specific optical power level.

These objects are achieved by utilizing the mechanism of the present invention in combination with known mechanisms to create attenuation in the fiber optic loop. Such known mechanisms include numerical aperture mismatch between the fiber end of the emitter or detector, core diameter mismatch of different fibers making up the loop, and filtering optical power by use of a filter in the form of a glass or film. Such known mechanisms and simulators utilizing such mechanisms are useful in approximating a targeted attenuation, but often do not provide sufficiently exact values of attenuation, and are not generally variable, once produced. Useful would be a device capable of adjusting the attenuation achieved by the approximating mechanisms of core diameter mismatch, use of filters or the like.

By the present invention, attenuation in the loop is increased and fine tuned by controllably inducing bending in the optical fiber that forms the loop of the attenuator as described hereinafter.

The increase in attenuation brought about by bending is based upon the structure of the optical fiber which typically consists of two concentric regions; the core, which has a refractive index higher than the outer region, the cladding. Light injected into the core and striking core-to-cladding interface at an angle greater than the critical is reflected back into the core, or, for graded index fibers, is continually refracted in such a manner as to confine the light to approximately the core region. In both types of fibers, attenuation is changed by bending the fiber, and such change depends on the bend radius, among other factors.

SUMMARY OF THE INVENTION

The invention resides in a simulator in the form of a loop-back attenuator that is constructed for disconnect coupling to an optical connector for bidirectional optical communications. According to the invention, controlled attenuation is provided to the simulator by affecting the minimum bend radius of the loop by interjecting or retracting a plunger against the loop-back optical fiber.

A further aspect of the invention resides in a plug compatible shape for a loop-back attenuator specifically for disconnect coupling to an optical connector of an emitter and detector of an item of optical equipment such as a transceiver mounted on a printed circuit board. The optical simulator of the present invention is a loop-back attenuator shaped to be interchangeable with a complementary connector that intermates with an optical connector having an optical emitter and an optical detector, the optical simulator comprising an alignment fixture with connectors for intermating with the optical emitter and the optical detector and an optical fiber formed in a loop and installed within the alignment fixture with a first end face of the loop aligned, through a corresponding alignment fixture connector, with the emitter and a second end face of the loop aligned, through a corresponding alignment fixture with the detector of the optical connector. An adjustable plunger mechanism is fitted through the body of the alignment fixture to impose against the optical fiber formed in a loop to thereby vary the degree of curvature of the loop by interjecting and retracting the plunger against the loop. The plunger may be made adjustable by comprising a plunger element with nose and a cap inwardly threaded to mate with the outward threads of an extension section of the alignment fixture. The adjusting mechanism may be, for example, a micrometer type screw mechanism similar to the type used in a micrometer caliper.

DESCRIPTION OF THE DRAWINGS

FIG. 2 is a fragmented perspective view with parts exploded, of the loop-back attenuator of the present invention.

FIG. 3 is a side view of the loop-back attenuator engaged with the optical connector mounted on a circuit board Referring to FIG. 1, is shown a portion of a printed circuit board 1 of a type found internally of an item of optical equipment, not shown, that has an optical transmitter 2 and an optical receiver 3. In reference to FIG. 3, an optical emitter 4 of the transmitter 2 and an optical detector 5 of the optical receiver 3 are adjacent each other and are received by a transceiver adapter assembly 6 that is mounted on the circuit board 1 and that is constructed for disconnect coupling with a complementary connector 7 provided with optical fiber cables 8 and 9 that are part of a bidirection communications system, not shown, to which the transmitter 2 and receiver 3 are coupled for bidirection optical communications with other items of the system.

Figure 1:
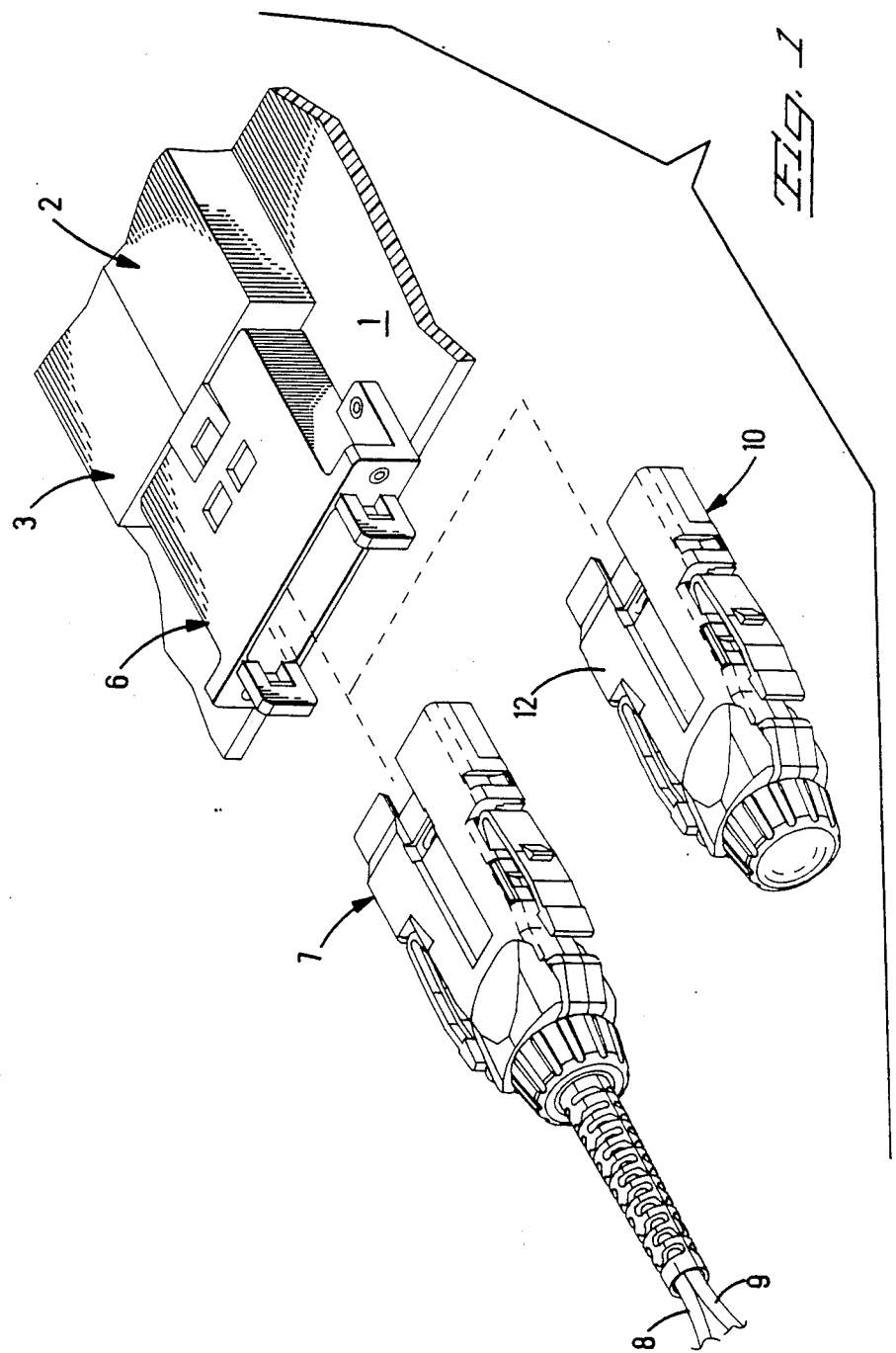
FIG. 1 is a perspective view of the optical simulator adapted for disconnect connection, in place of a shown complementary connector for optical fiber cable, with an optical connector mounted on a circuit board together with an optical detector and an optical emitter.

A simulator 10 in the form of a loop-back attenuator 10 is shown in FIGS. 1, 2 and 3 and is constructed for disconnect coupling with the assembly in which simulates the optical attenuation of the system to which the transmitter and receiver is coupled for bidirection communication. Attenuator 10 provides a loop-back optical path providing an optical fiber 11 that receives the optical emission from emitter 4 and guides the optical emission along the loop-back path of the fiber 11 to the detector 5 for use in testing the operation of the item of optical equipment in which the transmitter 2 and receiver 3 are incorporated. The attenuator 10 comprises a hollow body of molded upper cover 13 and molded cover 14. The covers 13 and 14 are of insulated plastic material formed by molding into a shape that has an exterior with dimensions that intermate with the optical connector 6 to thereby serve as a substitute for the connector 7 associated with the optical fiber cables 8 and 9. Both the upper cover 12 and the lower cover 13 are complementary contoured in their interiors so as to form cavities shaped to securely encompass and hold in place loop-back fiber 11 as is hereinafter described.

Referring to FIG. 2 and FIG. 3, attenuator 10 is shown with threaded plunger cap 15 with inward threads 16 for fit with the outward directed threads 17 and 18 of extension sections 19 and 20 to secure upper cover 13 together with lower cover 14 to provide an enclosure for optical fiber 11. The function of the plunger cap 15 in controllable inducing attenuation will be described hereinafter with reference FIG. 3.

At each end of optical fiber 11 are fiber connectors 21 and 22 with alignment ferrules 23 and 24. Rear flanges 25 and 26 and truncated cone-shaped lead-in, sections 27 and 28 are formed so as to nestle within complementary cavities formed at 29 and 30 by the closure of upper cover 13 and lower cover 14. Springs 31 and 32 bias the lead-in sections 27 and 28 to form secure fits within cavities 29 and 30.

Shown in FIG. 3 is optical fiber 11 enclosed within alignment fixture 12 and alignment fixture 12 engaged, in place of the complementary connector 7, with transceiver adapter assembly 6 of transmitter 2. Alignment ferrules 23 and 24 of optical fiber 11, fit within the through passageways 33 and 34 of active device mounts 35 and 36 of the transceiver adapter assembly 6 to align end face 37 of optical fiber 11 with optical emitter end 38 of the optical transmitter 2 and to align end face 39 of optical fiber 11 with optical detector end 40 of the optical receiver 3. The alignment fixture 12 is secured within the transceiver adapter assembly 6 by biased spring fit of latch 41 and latch 42 against the inner walls of the assembly 6. Threaded plunger cap 15 is characterized by head adapted for hand turning to wind the cap 15 along threads 17 and 18 of the simulator 10 to thereby cause plunger 44 to impose against the optical fiber 11.

In order to simulate the operation of optical communication systems, most applications require, and most manufacturers specify simulators, which will provide an attenuation in the range of from 12 dB to about 1 dB. Preferably, and for the great majority of applications the attenuation provided by the present invention for a given wavelength will range between 3 and 10 dB.

EXAMPLE

A loop-back attenuator 10 is constructed and modified with a filter glass to provide a target 10 dB loss with an optical fiber 11 of 1.3 um center wavelength. The particular thickness of filter to be utilized is determined by the relationship $T_i = 10^{(-LOSS/10)}/R_c$ where $T_i$ equals the internal transmission of filter and the LOSS is the desired loss in dB's which has been specified at 10 dB. The filter to be used is a 1.3 um center wavelength optical power filter specified as SCHOTT KG5 from Schott Glass Technologies, Inc., 400 York Avenue, Duyea, Pennsylvania, 18642. Referring to the *SCHOTT Filter Glass* catalog, the $R_c$ reflection coefficient of the SCHOTT KG5 filter is 0.92. By the relationship above, $T_i$ is calculated at 0.108 or 10.8% internal transmission for the target 10.0 dB loss. Referring to the transmission curves as provided in the SCHOTT Filter Glass catalog, the desired filter thickness for KG5 filter glass of 1.3 um center wavelength is determined to be 0.4 mm.

The simulator 10 with adjustable plunger mechanism 15 and utilizing the loop-back optical fiber 11 is constructed by utilizing FSD ceramic connectors 21 and 22 with 2.5 mm diameter ferrules 23 and 24. A square filter, 0.050 by 0.050 inches and of the thickness as determined above, is attached to the end face of the optical fiber 11 at the receiver, i.e., detector side 39. A small droplet of epoxy is applied to receiver ferrule 24 end face, and the filter piece is placed on the receiver ferrule 23 end face with tweezers. The connector 21 is then heated for two hours at 65 degrees Celsius to cure the epoxy attaching the filter. Thereafter, the simulator 10 is closed by attaching the top upper cover 13 by snapping it into connection with the molded lower cover back 14 containing the loop-back fiber 11.

To determine the loss, an attenuator 10 constructed with a 62.5/125 mm. fiber 11 without attached filter 43 is connected to the optical receiver 3 to give a reference reading from the detector 5. Thereafter, the simulator 10 with adjustable plunger mechanism 15 and utilizing the loop-back attenuator with filter 43, as constructed as described, is connected and a reading taken at the receiver side. LOSS is determined by the relationship: $LOSS = -10log(P_o/P_i)$ where $P_o$ is the signal from the detector 5 using the filtered loop-back and $P_i$ is the signal from the detector 5 utilizing the reference loop-back. Three readings are taken using the constructed simulator of the present invention and the values determined range from 9.2 to 9.5 dB. Then attenuation is adjusted by hand turning threaded cap 15 to wind the cap 15 and plunger to impose against the optical fiber, a longitudinal distance of 3 mm. Again, three readings are taken and the values determined range from 9.7 to 9.9 dB. The plunger is imposed an additional longitudinal distance of 1 mm and readings are taken and the values determined range from 9.9 to 10.1 dB.

We claim:

1. An optical simulator shaped to be interchangeable with a connector that intermates with an optical connector having an optical emitter and optical detector, the optical simulator comprising: an alignment fixture with connectors for intermating with the optical emitter and the optical detector, and an optical fiber formed in a loop and installed within the alignment fixture with a first end face of the loop aligned, through a corresponding fiber connector, with the emitter, and a second end face of the loop aligned, through a corresponding fiber connector, with the detector of the optical connector, the optical simulator further comprising: an adjustable plunger mechanism fitted through a body of the alignment fixture to impose against the optical fiber formed in a loop to permit varying the degree of curvature of the loop by interjecting and retracting the plunger mechanism against the loop.

2. The optical simulator of claim 1 wherein the alignment fixture has a rear extension section with outward directed threads and said plunger mechanism comprises; a plunger element with a nose imposing against said optical fiber, and a cap inwardly threaded to mate with the threads of the extension section.

3. The optical simulator of claim 2 wherein the alignment fixture comprises and upper cover with an extension section having outwardly directed threads and a lower cover with an extension section having outwardly directed threads.

4. The optical simulator of claim 3 wherein the upper and lower covers are attached, and are secured by said threaded cap interthreaded with the threads of an extension section formed by fitting together the extension section of the upper cover and the extension section of the lower cover.

5. The optical simulator of claim 1 wherein the optical fiber formed in a loop further has an optical filter attached to an end face of the fiber to provide attenuation of optical power to the optical detector.

6. The optical simulator of claim 1 wherein the optical connector having the emitter and the detector is an adapter assembly of a transceiver.

* * * * *